United States Patent
Firmbach et al.

(10) Patent No.: US 12,433,614 B2
(45) Date of Patent: Oct. 7, 2025

(54) SURGICAL INSTRUMENT

(71) Applicant: Aesculap AG, Tuttlingen (DE)

(72) Inventors: Franz-Peter Firmbach, Emmingen-Liptingen (DE); Svenja Anhorn, Heroldstatt (DE)

(73) Assignee: Aesculap AG, Tuttlingen (DE)

( * ) Notice: Subject to any disclaimer, the term of this patent is extended or adjusted under 35 U.S.C. 154(b) by 251 days.

(21) Appl. No.: 18/328,092

(22) Filed: Jun. 2, 2023

(65) Prior Publication Data

US 2023/0389942 A1    Dec. 7, 2023

(30) Foreign Application Priority Data

Jun. 3, 2022   (DE) ...................... 10 2022 205 693.0

(51) Int. Cl.
  *A61B 17/15*  (2006.01)
  *A61B 17/17*  (2006.01)
  *A61B 17/16*  (2006.01)

(52) U.S. Cl.
  CPC ........ *A61B 17/1764* (2013.01); *A61B 17/157* (2013.01); *A61B 17/1675* (2013.01)

(58) Field of Classification Search
  CPC .............. A61B 17/157; A61B 17/1675; A61B 17/1764
  See application file for complete search history.

(56) References Cited

U.S. PATENT DOCUMENTS

| 5,704,941 | A | 1/1998 | Jacober et al. |
| 2015/0045801 | A1* | 2/2015 | Axelson, Jr. ........... A61B 17/15 606/88 |
| 2019/0231365 | A1 | 8/2019 | Steensen et al. |
| 2021/0244421 | A1 | 8/2021 | Siccardi et al. |
| 2022/0211389 | A1 | 7/2022 | Gassner et al. |
| 2023/0063563 | A1 | 3/2023 | Firmback et al. |

FOREIGN PATENT DOCUMENTS

| JP | 201430536 A | 2/2014 |
| WO | 2020049421 A1 | 3/2020 |
| WO | WO-2022189892 A1 * | 9/2022 ........... A61B 5/1072 |

* cited by examiner

*Primary Examiner* — Samuel S Hanna
(74) *Attorney, Agent, or Firm* — Christopher A. Rothe; CM Law (57) ABSTRACT

A surgical instrument and system for use in a knee joint replacement operation. The instrument has a main body fastenable to a tibial cutting block. A first stylus and second stylus are each mounted on and movable relative to the main body, and are elongate between a first end and a second end. The first ends each have a reference surface for contacting a tibial plateau of the tibia. A compensation element is attachable to one of the styluses and has a plug-in section and a contact surface. The first ends each have a complementary plug-in section configured for releasable connection to the plug-in section. The contact surface is configured—when the compensation element is attached to the respective stylus—for contacting the tibial plateau instead of the respective reference surface and is spaced apart from the respective reference surface by a thickness dimension.

14 Claims, 6 Drawing Sheets

SURGICAL INSTRUMENT

CROSS-REFERENCE TO RELATED APPLICATION(S)

This application claims priority under 35 U.S.C. § 119 to German Application No. 10 2022 205 693.0, filed on Jun. 3, 2022, the content of which is incorporated by reference herein in its entirety.

FIELD

The present disclosure relates to a surgical instrument for use in a knee joint replacement operation.

BACKGROUND

In a knee joint replacement operation, or total knee arthroplasty (TKA), joint surfaces of the femur and/or tibia that have become worn or have been otherwise affected by disease or by injury are replaced by artificial joint surfaces of a knee joint prothesis. Such knee joint protheses usually comprise a femoral component and a tibial component. The femoral component is implanted at the distal end of the femur. The tibial component is implanted at the proximal end of the tibia.

Before the implantation of the prosthetic components, the distal femur and the proximal tibia are resected. For this purpose, the surgeon makes different resection cuts and separates bone and/or cartilage material from the respective bone. The resection enables the respective bone to be adapted in its shape to the prosthetic component to be received.

The resection can be carried out on the basis of different concepts. One concept aims to keep the stresses of the ligaments of the knee balanced during the movement of the joint. This is intended to ensure better functioning of the knee joint prosthesis. This concept is generally referred to as "gap balancing". In other concepts, the surgeon uses the resection to remove a certain amount of bone and cartilage material. Such concepts are generally referred to as "measured resection". The alignment of the resection cuts with respect to the patient's anatomy determines the subsequent alignment of the implanted components and consequently also the orientation of the prosthetic joint axes. The alignment of the resection cuts is therefore of particular importance.

Three approaches are primarily differentiated in the alignment of the resection cuts: mechanical, anatomical and kinematic. Mechanical alignment involves resection of the proximal tibia perpendicularly to the longitudinal axis of the tibial shaft. The resection of the distal femur takes place in a manner correspondingly adapted thereto. If required, ligament releases are performed. Anatomical alignment attempts to resect the tibia at 3° of varus. Femoral resection and ligament releases are performed to keep a straight hip-knee-ankle axis of the leg. The goal of kinematic alignment is to implant the artificial joint surfaces of the prosthetic components at the level of the natural, defect-free joint surface present prior to the development of arthritis. Clinical studies have shown that kinematic alignment can often achieve improved patient satisfaction since the function of the artificial knee joint is perceived to be quite natural.

Against this background, there is a fundamental requirement for surgical instruments for realising kinematic alignment that are as precise as possible, are simple to use and are cost-efficient.

Various surgical instruments of this type are known from the prior art.

WO 2020/049421 A1 discloses a tibial alignment instrument with a main body and two styluses. The main body is configured in the form of a peg and is fastenable to a section, configured for this purpose, of a tibial cutting block. The two styluses are each mounted on the main body so as to be movable relative thereto and are elongate between a first end and a second end. The first ends are in each case configured for contacting the proximal tibia, more precisely: the tibial plateau. The two styluses can each be attached in different proximodistal positions relative to the main body. This is intended to dimensionally compensate for bone and/or cartilage defects on the tibial plateau.

US 2019/0231365 A1 discloses a further surgical instrument for aligning the tibial cut. The first ends of the two styluses of said instrument are adjustable in their position relative to the tibial plateau by means of an adjustment mechanism. The adjustment mechanism in each case comprises a linear guide with a type of ratchet on each of the styluses. The design is rather complex.

SUMMARY

The present disclosure is concerned with a surgical instrument for aligning the tibial resection. Such instruments are also referred to as a (tibial) alignment instrument or tibial resection guide device.

It is an object of the present disclosure to make available a surgical instrument for use in a knee joint replacement operation that affords advantages over the prior art and in particular permits an improved alignment of the proximal tibial cut, with the intention at the same time to achieve or retain a simple design.

The surgical instrument according to the present disclosure has: a main body which is configured for releasable fastening to a tibial cutting block for cutting guidance on a proximal tibia, a first stylus and a second stylus which are each mounted on the main body so as to be movable relative thereto and are elongate between a first end and a second end, wherein the first ends each have a reference surface which is configured for contacting a tibial plateau of the tibia along a contact direction, wherein there is at least one compensation element which is provided for selective attachment to one of the two styluses and which has a plug-in section and a contact surface, and wherein the first ends each have a complementary plug-in section which is configured for the form-fitting and/or force-fitting, releasable connection to the plug-in section of the compensation element, and wherein the contact surface—in a state of the compensation element in which it is attached to the respective stylus—is configured for contacting the tibial plateau instead of the respective reference surface and is arranged along the contact direction in a manner spaced apart from the respective reference surface by a thickness dimension. The solution according to the present disclosure makes it possible to dimensionally compensate for defects in the tibial plateau in a simple manner. For this purpose, there is the at least one compensation element and the latter can be attached selectively to the first stylus or to the second stylus, more specifically: at the first ends thereof. In comparison to solutions which are known from the prior art and in which the compensation takes place via an adjustment mechanism or a positional change of the styluses, the solution according to the present disclosure is in particular less prone to error. This is because the surgeon can simply and unambiguously identify whether there is compensation, or not. If the at least one compensation element is attached to one of the two styluses, there is compensation. If this is not the case, there is no compensation. In the case of the solutions known from the prior art, erroneous adjustments which can be difficult to identify may occur. In addition, the surgical instrument according to the present disclosure has a simple design. This is also in contrast to known solutions with adjustability of the position of the first ends. The simple design also permits cost-efficient installation and removal. The latter is in particular for cleaning purposes. Cleaning per se is also facilitated by the simple design. The at least one compensation element can be plugged selectively together with the first end of the first stylus or the first end of the second stylus. For this purpose, the at least one compensation element has the aforementioned plug-in section. The two first ends each have a complementary plug-in section. In the attached state, the plug-in section and the respective complementary plug-in section form a releasable plug-in connection. The plug-in connection can be established purely manually without the assistance of a tool or other aids. The plug-in connection is formed directly between the compensation element and the respective first end. Additional connecting means are not present. In a state of the surgical instrument in which the at least one compensation element is not attached to either of the styluses, the reference surfaces thereof in each case bear against the tibial plateau. For example, the reference surface of the first stylus bears against the medial tibial plateau and the reference surface of the second stylus bears against the lateral tibial plateau. In a state of the surgical instrument in which the at least one compensation element is attached to the first stylus, the contact surface of the compensation element contacts the (medial) tibial plateau. The contact takes place instead of the reference surface of the first stylus. Expressed in other words, the contact surface overlaps the reference surface and is spaced apart here from the latter by the aforementioned thickness dimension. The thickness dimension is adapted to the defect to the compensated for. In a preferred embodiment, the surgical instrument comprises a plurality of different compensation elements for compensating for differently sized defects on the tibial plateau. In a preferred embodiment, the reference surfaces of the two first ends are arranged in a common reference plane. The reference surfaces can each be actual surfaces, lines or points. The latter for example whenever the first ends are pointed, and therefore it is also possible to refer to a first stylus tip and a second stylus tip. The reference surfaces are preferably formed by a preferably flat front face of the respective first end facing the tibial plateau. In different embodiments, the contact surface differs and is, for example, flat, conical or concave.

The position and direction designations used in this description relate to the body of a patient, in particular the tibia of the patient, and to this extent they are to be understood in accordance with their usual anatomical meaning. Consequently, "anterior" denotes front or lying to the front, "posterior" denotes rear or lying to the rear, "medial" denotes inner or lying to the inside, "lateral" denotes outer or lying to the outside, "proximal" denotes towards the centre of the body, and "distal" denotes away from the centre of the body. Furthermore, "proximodistal" denotes along, preferably parallel to, a proximal-distal axis, "anteroposterior" denotes along, preferably parallel to, an anterior-posterior axis, and "mediolateral" denotes along, preferably parallel to, a medial-lateral axis. The aforementioned axes are orthogonal to one another and can of course be understood in relation to X, Y and Z axes not associated with the anatomy of the patient. For example, the proximal-distal axis can be designated alternatively as the X axis. The medial-lateral axis can be designated as the Y axis. The anterior-posterior axis can be designated as the Z axis. For the sake of better illustration and simplicity of the designations, the aforementioned anatomical position and direction designations are primarily used in the following. Moreover, designations such as the "rear face" of a component or of a section of the surgical instrument, for example the compensation element, are used with respect to a distally oriented viewing direction. By contrast, designations such as "front face" are used with respect to a proximally oriented viewing direction.

In one embodiment of the present disclosure, the plug-in section can be plugged together with the respective complementary plug-in section along a plug-in direction which is oriented parallel to a longitudinal axis of the respective stylus and/or orthogonally with respect to the contact direction. Such an orientation of the plug-in direction permits in particular ergonomic attachment and removal of the at least one compensation element. During the use of the surgical instrument, the longitudinal axes of the styluses are oriented at least substantially anteroposteriorly. The contact direction is oriented at least substantially distally. By means of the plug-in direction oriented orthogonally to the contact direction, the plug-in section and the respective complementary plug-in section can also be plugged together (and unplugged from one another) when the two styluses have already been positioned in the region of the tibial plateau.

In a further embodiment of the present disclosure, the plug-in section and/or the complementary plug-in sections each have/has a rotationally asymmetrical cross section. The rotationally asymmetrical cross section counteracts an inadvertent relative rotation between the plug-in section and the relevant complementary plug-in section. The rotational symmetry refers here to the plug-in direction along which the plug-in section can be plugged together with the respective complementary plug-in section.

In a further embodiment of the present disclosure, the complementary plug-in sections each have an elongate receiving slot which is configured for the force-fitting and/or form-fitting receiving of the plug-in section. The plug-in section is configured at least in sections in a complementary manner to the receiving slot. In one embodiment, the plug-in section of the compensation element can be plugged into the receiving slot along the longitudinal extent thereof. In a further embodiment, the plug-in section can be plugged into the receiving slot transversely, preferably orthogonally, with respect to the longitudinal extent of the receiving slot. The receiving slot is comparatively simple to manufacture and also permits particularly simple and thorough cleaning. The receiving slot is preferably elongate rectilinearly. In one embodiment, the receiving slot is open at one end. In a further embodiment, the receiving slot is closed on both sides. In addition, a configuration which is open on both sides is conceivable. In addition, the slot can be delimited in its vertical direction in the manner of a groove by a base on one side. Alternatively, the receiving slot can be open on both sides along its vertical direction, i.e. as a through slot.

In a further embodiment of the present disclosure, the receiving slot is elongate along its longitudinal direction between an insertion opening and a stop. Consequently, the receiving slot is open at one end and closed at the other end in the longitudinal direction. The insertion opening permits ergonomic plugging in of the plug-in section in the longitudinal direction of the receiving slot. The stop limits a plugging-in depth of the plug-in section. The stop ensures a consistently constant positioning of the compensation element in relation to the respective stylus during repeated attachment and removal.

In a further embodiment of the present disclosure, the receiving slot reaches in a vertical direction, which is oriented transversely with respect to its longitudinal direction, from the reference surface as far as a rear face of the respective first end, the rear face lying opposite the reference surface along the contact direction. During use of the surgical instrument, the contact direction is oriented at least substantially distally, i.e. the reference surface of the relevant first end bears distally against the tibial plateau. The same applies, mutatis mutandis, to the contact surface of the at least one compensation element if the latter is attached to one of the two styluses. The rear face lies opposite the reference surface along the contact direction, i.e. substantially proximally. The vertical direction of the receiving slot is oriented transversely, preferably orthogonally, to its longitudinal direction. During use, the vertical direction is consequently oriented proximodistally. In this embodiment, the receiving slot extends along its vertical direction through the first end and reaches from the rear face as far as the reference surface. Such a continuous configuration of the receiving slot permits in particular further simplified cleaning. In particular, the receiving slot which to this extent is continuous permits improved visibility of the tibial plateau if the at least one compensation element is not attached to the relevant first end. The improved visibility permits a precise visual check of the contact conditions prevailing between the reference surface and the tibial plateau.

In a further embodiment of the present disclosure, the receiving slot is formed between two, preferably spring-elastic, prong sections of the respective first end, the prong sections lying opposite one another in a transverse direction oriented transversely with respect to the longitudinal direction of the receiving slot. In this embodiment of the present disclosure, the first end consequently has a fork-shaped configuration. If the prong sections are configured to be spring-elastic, this assists a reliable connection between the plug-in section and the receiving slot.

In a further embodiment of the present disclosure, the plug-in section protrudes from a rear face of the compensation element, said rear face lying opposite the contact surface along the contact direction. During use of the surgical instrument, the rear face is oriented proximally. The rear face is preferably flat. Improved visibility is produced by arranging the plug-in section on the rear face. This permits a particularly simple visual check of the plug-in connection.

In a further embodiment of the present disclosure, the plug-in section has a shank and a head, wherein the shank is elongate between the rear face of the compensation element and the head and can be plugged together transversely with respect to its longitudinal extent with the complementary plug-in section of the respective first end, the head having a larger diameter than the shank. Expressed in simplified terms, in this embodiment, the plug-in section is configured in the shape of a mushroom head and/or as a mushroom head. The shank is connected at one end to the rear face and at the other end to the head. The shank is elongate rectilinearly. During use of the surgical instrument, the shank is oriented proximodistally and protrudes proximally from the rear face. The head is arranged at a proximal end of the shank. The head forms the end of the plug-in section. For the purposes of the plugging together with the respective complementary plug-in section, the shank is brought together with the complementary plug-in section not for example with the head in front, but rather instead transversely, preferably orthogonally, with respect to its longitudinal extent. The head acts as an additional holding element and counteracts an inadvertent relative extension of the shank in relation to the complementary plug-in section. For this purpose, the head has a larger diameter than the shank. This embodiment is particularly advantageous if the complementary plug-in sections of the two styluses each have a receiving slot.

In a further embodiment of the present disclosure, the shank and/or the head have/has a rotationally asymmetrical cross section. The rotationally asymmetrical cross section counteracts an inadvertent relative rotation between the plug-in section, in particular the shank and/or the head, and the respective complementary plug-in section.

In a further embodiment of the present disclosure, the contact surface is curved convexly. The convex curvature of the contact surface permits in particular improved visibility of the contact conditions prevailing between the compensation element and the tibial plateau. This permits an improved visual check for the surgeon.

In a further embodiment of the present disclosure, the at least one compensation element has a spherical segment section with a spherical dome which forms the contact surface. The spherical segment section is arranged on a front face of the compensation element. The spherical dome has a circular border. This is accordingly true of the contact surface. Particular advantages are associated with this embodiment.

In a further embodiment of the present disclosure, there are a plurality of different compensation elements for selective attachment to the two styluses, the different compensation elements differing, preferably exclusively, in respect of their respective thickness dimension and/or a diameter of the respective contact surface and/or a curvature of the respective contact surface. The different compensation elements permit the compensation of different condylar defects on the tibial plateau. The compensation takes place with a comparatively thick or thin compensation element depending on the extent of the defect in the distal direction. The compensation takes place with a comparatively small or large (outside) diameter depending on the mediolateral and/or anteroposterior extent of the defect. The different curvatures permit a particularly precise adaptation of the compensation to the geometry of the defect which is present. The different compensation elements are identical in respect of their respective plug-in section. In other words, the different compensation elements have identically configured and/or shaped plug-in sections. By this means, each of the different compensation elements can be selectively attached to the first stylus or to the second stylus.

The present disclosure also relates to a surgical instrument system for use in a knee joint replacement operation, having a surgical instrument according to one of the preceding embodiments, a tibial cutting block, to which the surgical instrument is releasably fastened, and having an extramedullar alignment rod which is fastened releasably to the tibial cutting block.

BRIEF DESCRIPTION OF THE DRAWINGS

Further advantages and features of the present disclosure emerge from the description below of a preferred exemplary embodiment of the present disclosure that is illustrated with reference to the drawings.

DETAILED DESCRIPTION

According to FIGS. 1 to 4, a surgical instrument 1 is provided for use in a knee joint replacement operation and has a main body 100, a first stylus 200, a second stylus 300 and at least one compensation element 500.

Figure 1:
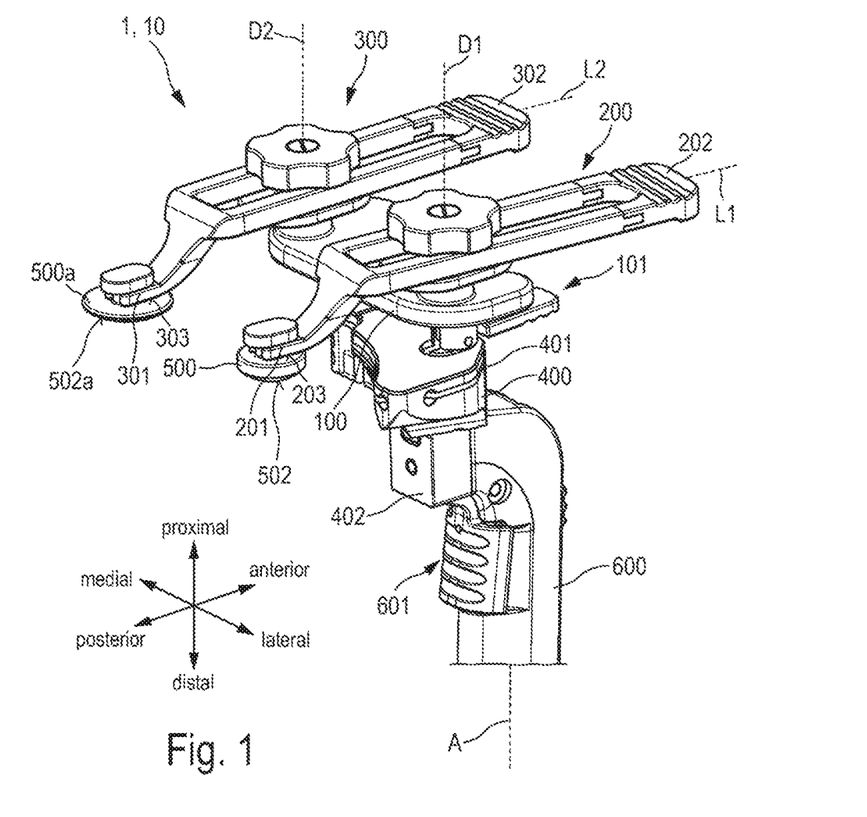
FIG. 1 shows a schematic perspective view of an embodiment of a surgical instrument according to the present disclosure.

In the configuration shown with reference to FIG. 1, the surgical instrument 1 is fastened releasably to a tibial cutting block 400 in a manner yet to be described in detail. An extramedullar alignment rod 600 is fastened releasably to the tibial cutting block 400. Together with the tibial cutting block 400 and the extramedullar alignment rod 600, the surgical instrument 1 forms a surgical instrument system 10.

Figure 3:
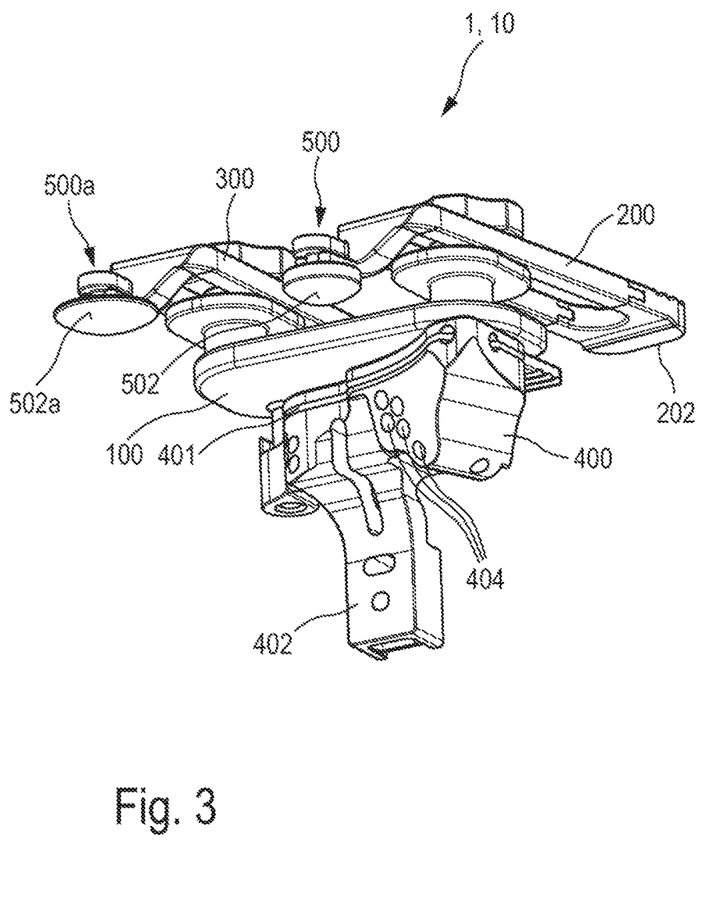
FIG. 3 shows a further schematic perspective view of the surgical instrument according to FIGS. 1 and 2.
Figure 4:
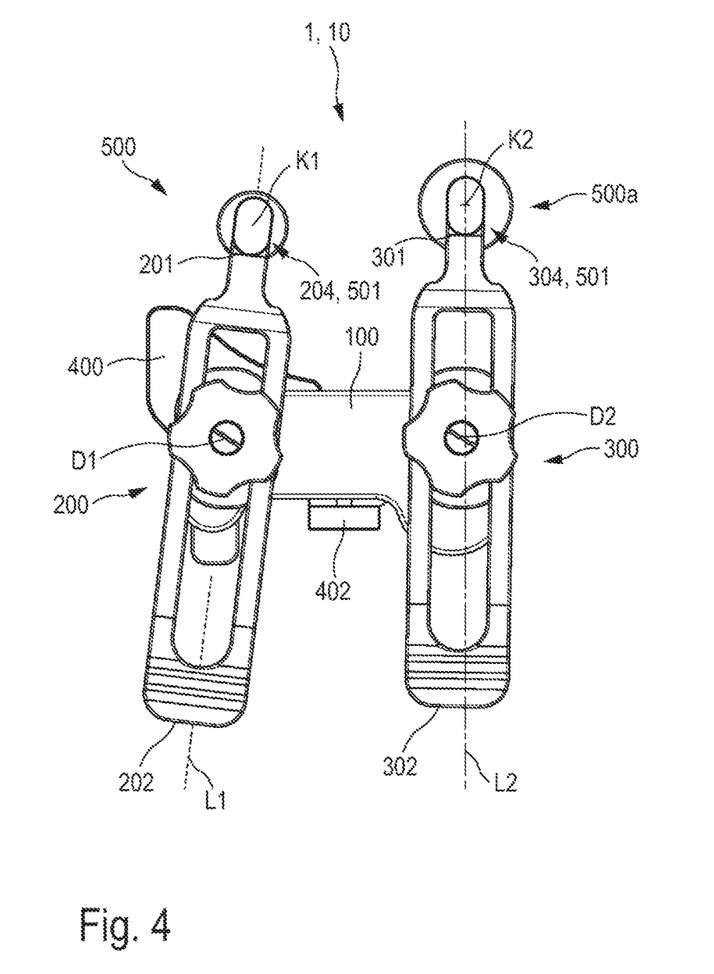
FIG. 4 shows a schematic plan view of the surgical instrument according to FIG. 1 to 3.

The tibial cutting block 400 has a fastening section 402. The fastening section 402 is configured in a manner known to a person skilled in the art for releasable fastening to the extramedullar alignment rod 600. For this purpose, the extramedullar alignment rod 600 has a fastening mechanism 601 which interacts with the fastening section 402 in a manner not shown specifically. Furthermore, the tibial cutting block 400 has passage bores 404 (FIG. 3). The passage bores 404 permit fixing of the tibial cutting block 400 to a proximal tibia T. For this purpose, after the tibial cutting block 400 has been aligned, fastening screws or pins are introduced through the passage bores 404 into the proximal tibia T.

The main body 100 is configured for releasable fastening to the tibial cutting block 400. For this purpose, in the embodiment shown, the main body 100 has a fastening mechanism 101. The fastening mechanism 101 interacts in a manner not shown specifically with a section of the tibial cutting block 400 provided for this purpose. The type and manner of the releasable fastening of the main body 100 to the tibial cutting block 400 is not of substantial importance with respect to the present disclosure. Further details in this regard are therefore omitted.

The first stylus 200 extends between a first end 201 and a second end 202. The first stylus 200 extends along a first longitudinal axis L1. The first longitudinal axis L1 defines a main direction of extent of the first stylus 200. The first stylus 200 is mounted on the main body 100 so as to be movable relative thereto. In the embodiment shown, the first stylus is pivotable relative to the main body 100 about a first pivot axis D1. In addition, the first stylus 200 is guided in a linearly movable manner along its first longitudinal axis L1 relative to the main body 10. The specific implementation of the pivotable and linearly movable guide of the first stylus 200 is not an essential aspect of the present disclosure. Further details in this regard can therefore be dispensed with. The first end 201 of the first stylus 200 has a reference surface 203 (see FIGS. 5, 6). The reference surface 203 is configured for contacting a tibial plateau TP (see FIG. 2).

The second stylus 300 is elongate between a first end 301 and a second end 302. The second stylus 300 has a second longitudinal axis L2. The second longitudinal axis L2 defines a direction of main extent of the second stylus 300. The second stylus 300 is mounted on the main body 100 so as to be pivotable about a second pivot axis D2 relative thereto. In addition, the second stylus 300 is guided in a linearly movable manner along its longitudinal axis L2 relative to the main body 100. That which has been stated with regard to the first stylus 200 applies, mutatis mutandis, to the second stylus 300. The type and manner of the pivotable and linearly movable mounting of the second stylus 300 in relation to the main body 100 is not of substantial importance with respect to the present disclosure. Further details are therefore not discussed. The first end 301 of the second stylus 300 has a reference surface 303. The reference surface 303 of the second stylus 300 is configured for contacting the tibial plateau TP.

The at least one compensation element 500 is configured for selectively attaching to one of the two styluses 200, 300. In the configuration shown with reference to FIGS. 1 to 4, the compensation element 500 is attached to the first stylus 200. The compensation element 500 is used for dimensional compensation of possible bone and/or cartilage wear at the tibial plateau TP. This takes place in the manner yet to be described in detail. The compensation element 500 is also referred to below as first compensation element. Furthermore, in the configuration of the surgical instrument 1 according to FIGS. 1 to 4, a second compensation element 500a is attached to the second stylus 300. Different configurations are conceivable and provided here. For example, the first compensation element 500 instead of the second compensation element 500a can be attached to the second stylus, and vice versa.

Alternatively, only one of the compensation elements 500, 500a can be attached to one of the two styluses 200, 300. Furthermore alternatively, the surgical instrument 1 can also be used without attachment of the compensation elements 500, 500a. For further explanation of the function and the design of the surgical instrument 1, a configuration of this type without compensation elements 500, 500a will firstly be discussed below. This will be discussed with reference to the intraoperative situation which is illustrated in FIG. 2 and in which the surgical instrument 1 is placed on the tibial plateau TP of the proximal tibia T.

Figure 2:
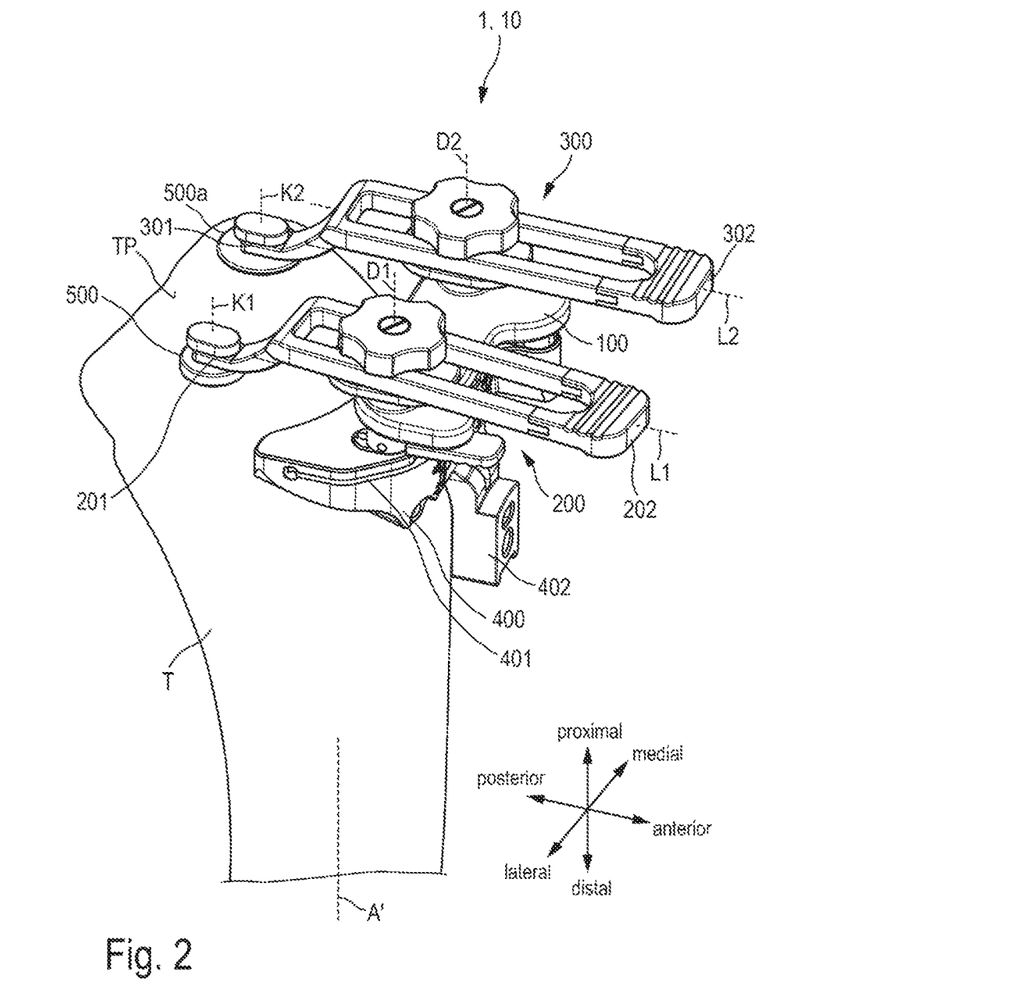
FIG. 2 shows a further schematic perspective view of the surgical instrument according to FIG. 1 in an exemplary intraoperative situation in which the surgical instrument is positioned on a proximal tibia.

In the situation shown with reference to FIG. 2, the two pivot axes D1, D2 are each aligned proximodistally. The first longitudinal axis L1 and the second longitudinal axis L2 of the two styluses 200, 300 are arranged in a common plane (no reference sign). The aforementioned plane extends mediolaterally and anteroposteriorly and to this extent is a transverse plane. The reference surfaces 203, 303 of the two styluses 200, 300 are arranged in a common reference plane (no reference sign). The reference plane extends mediolaterally and anteroposteriorly and is consequently a transverse plane.

Starting from the situation illustrated in FIG. 2, it is first of all assumed for the explanation below that neither the (first) compensation element 500 nor the second compensation element 500*a* is attached to the styluses 200, 300. In this situation, the main body 100 is fastened releasably to the tibial cutting block 400 by means of the aforementioned fastening mechanism 101. The tibial cutting block 400 has a configuration and function known in principle to a person skilled in the art. The tibial cutting block 400 is used as a cutting guide during a resection of the proximal tibia T. During such a resection, the tibial plateau TP is severed in a defined manner. For this purpose, the tibial cutting block 400 has a receiving slot 401 which is configured for receiving and guiding a saw blade. The alignment of the tibial cutting block 400—and therefore also that of the receiving slot 401—with respect to anatomical landmarks of the proximal tibia T determines the subsequent alignment of the (artificial) tibial plateau present after the resection. The artificial tibial plateau in turn determines the subsequent orientation of the artificial knee joint replacement and the joint axis thereof. By means of the surgical instrument 1, the tibial cutting block 400, more precisely: the receiving slot 401 thereof, can be aligned in a defined manner relative to the proximal tibia T.

This alignment first of all takes place using the extramedullar alignment rod 600 (blanked out graphically in FIG. 2). The extramedullar alignment rod 600 has a longitudinal axis A. The longitudinal axis A is aligned along a longitudinal axis A' (see FIG. 2) of the tibia T. the longitudinal axis A is then aligned proximodistally with respect to the anatomical axes indicated in FIGS. 1 and 2. In a further step, the styluses 200, 300 are aligned relative to the tibial plateau TP.

For further explanation, the starting point below is a first state of the tibial plateau TP and a second state of the tibial plateau TP. In the first state, the tibial plateau TP has no or no practically relevant wear on its cartilage and/or bone structure. In this first state, the surgical instrument 1, as already explained, is used without compensation elements 500, 500*a*. For the further alignment, the reference surfaces 203, 303 of the two styluses 200, 300 are then put into contact with the tibial plateau TP. The contact between the reference surfaces 203, 303 and the tibial plateau TP defines a proximodistal position of the receiving slot 401. In addition, rotation of the tibial cutting block 400 about an anteroposterior axis is determined by the referencing at the tibial plateau TP. The aforementioned rotation determines a varus/valgus alignment of the artificial knee joint replacement to be implanted.

In the embodiment shown, the reference surfaces 203, 303 are in each case flat. In embodiments which are not shown in the figures, the reference surfaces are configured differently for this purpose. For example, the reference surfaces can be curved, angled or not flat in some other way. In addition, the reference surfaces can be linear and/or punctiform. The latter for example because of a pointed configuration of the first ends of the two styluses.

In the present case—in the (imaginary) configuration without compensation elements—the reference surfaces 203, 303 are in contact along their respective normal direction with the tibial plateau TP. The first reference surface 203 is in contact with the tibial plateau along a first contact direction K1. The second reference surface 303 is in contact with the tibial plateau TP along a second contact direction K2. The two contact directions K1, K2 are oriented parallel to one another here. The two contact directions K1, K2 are aligned proximodistally here.

By means of the relative movability already explained of the two styluses 200, 300, the reference surfaces 203, 303 can be positioned so as to meet requirements and precisely on the tibial plateau TP.

With the above-described referencing at the tibial plateau TP, the so-called kinematic alignment approach (KA) is pursued. The aim of this approach consists in implanting the joint surfaces of the artificial knee joint replacement at the level of the defect-free natural joint surfaces prior to the development of arthritis. If defects are present, they can be compensated for in a simple manner by means of the surgical instrument 1.

In the second (defect-afflicted) state of the tibial plateau TP that is shown with reference to FIG. 2, the compensation in the region of the reference surface 203 of the first stylus 200 takes place by means of the first compensation element 500. In the region of the reference surface 303 of the second stylus 300, the compensation takes place by means of the second compensation element 500*a*. For the further explanation, reference is made primarily below to the first compensation element 500 and the interaction thereof with the first stylus 200. That disclosed in this respect also applies, mutatis mutandis, with respect to the second compensation element and the interaction thereof with the second stylus 300.

Figure 5:
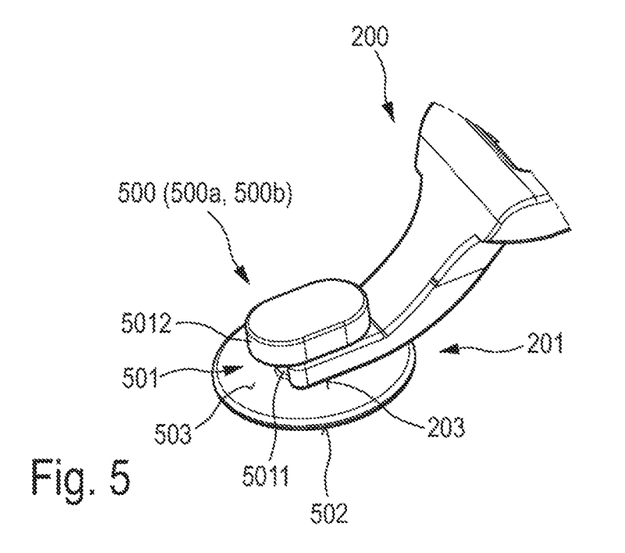
FIG. 5 shows an enlarged perspective illustration of a detail of the surgical instrument in the region of a stylus end to which a compensation element is releasably attached.
Figure 6:
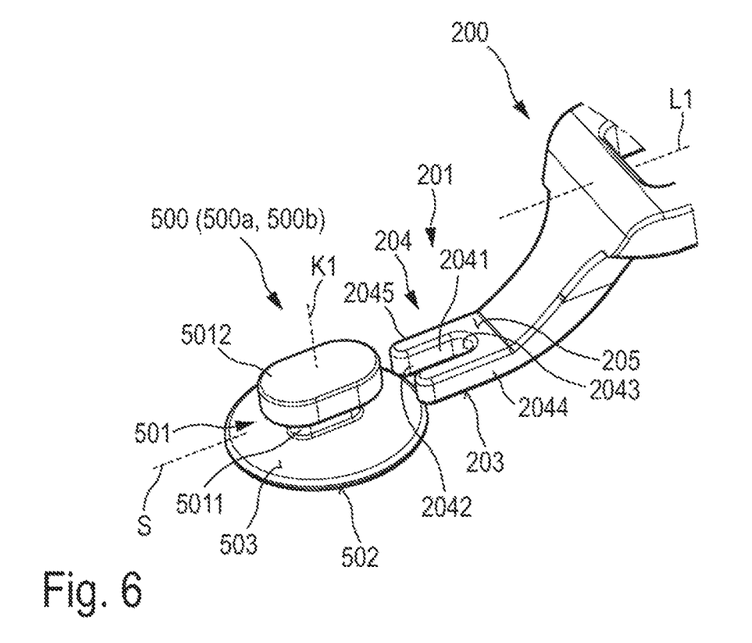
FIG. 6 shows a further illustration of the region of the detail according to FIG. 5, with the compensation element having been released from the stylus end.

For the releasable fastening to the first stylus 200, the compensation element 500 has a plug-in section 501 and a contact surface 502 (FIGS. 5 and 6). In the attached state of the compensation element 500, the contact surface 502 instead of the reference surface 203 comes to bear against the tibial plateau TP. The first end 201 has a complementary plug-in section 204. The plug-in section 501 and the complementary plug-in section 204 are configured for the form-fitting and/or force-fitting releasable connection to one another. In the interconnected state, the plug-in section 501 and the complementary plug-in section 204 form a releasable plug-in connection. The plug-in connection between the first end 201 and the compensation element 500 can be produced and released without a tool. That is to say, an operating surgeon can attach the compensation element 500 to the first stylus 200 and can release same therefrom purely manually without the assistance of a tool.

Figure 8:
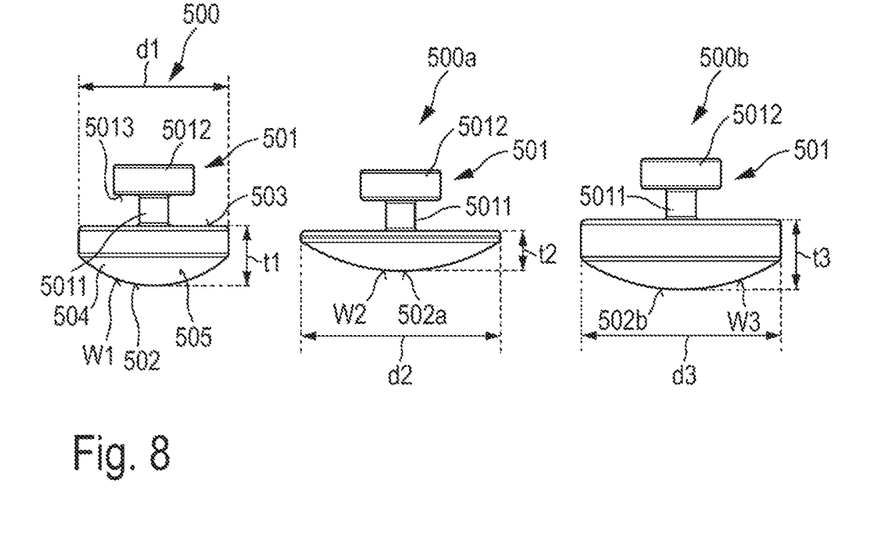
FIG. 8 shows the different compensation elements according to FIG. 7 in a schematic side view.

In the attached state of the compensation element (FIG. 5), the contact surface 502 is arranged below the reference surface 203 with respect to the first contact direction K1. In this case, the contact surface 202 is spaced apart along the first contact direction K1 from the reference surface 203 by a thickness dimension t1 (see FIG. 8). The thickness dimension t1 is coordinated in a manner yet to be described in detail to an extent of the defect to be compensated for.

In the embodiment shown, the aforementioned plug-in connection has a plug-in direction S which is oriented parallel to the first longitudinal axis L1 of the first stylus 200 and in addition orthogonally to the first contact direction K1. The plug-in direction S can also be referred to as plug-in axis. During use of the surgical instrument 1, the plug-in direction S is arranged in a transverse plane, not denoted specifically.

In the embodiment shown, the complementary plug-in section 204 has an elongate receiving slot 2041. The receiving slot 2041 is configured for the force-fitting and/or form-fitting receiving of the plug-in section 501. A longitudinal axis (no reference sign) of the receiving slot 2041 is oriented parallel to the first longitudinal axis L1 of the first stylus 200. The longitudinal extent of the receiving slot 2041 defines the plug-in direction S here. The receiving slot 2041 is elongate rectilinearly.

In the embodiment shown, the receiving slot 2041 has an insertion opening 2042 at one end and a stop 2043 at the other end. The plug-in section 501 of the compensation element 500 can be inserted through the insertion opening 2042 into the receiving slot 2041. The stop 2043 is used for form-fitting limiting of the insertion depth.

The receiving slot 2041 reaches from the reference surface 203 as far as a rear face 205 of the first end 201. The rear face 205 lies opposite the reference surface 203 along the first contact direction K1. The rear face 205 here is flat. A normal direction of the rear face 205 is oriented proximally during use of the surgical instrument 1. Consequently, the receiving slot 2041 reaches all the way along its vertical direction between the reference surface 203 and the rear face 205. In an embodiment not shown in the figures, the receiving slot 2041 is instead limited on one side in the vertical direction and designed in the manner of a groove. In a non-attached state of the compensation element 500, the continuity of the receiving slot 2041 affords improved visibility of the tibial plateau TP. By this means, the surgeon can visually check in an improved way whether the reference surface 203 is in contact with the tibial plateau TP.

In the embodiment shown, the receiving slot 2041 is formed between two prong sections 2044, 2045. The prong sections 2044, 2045 can also be referred to as first prong section 2044 and second prong section 2045. The two prong sections 2044, 2045 lie opposite one another along a transverse direction of the receiving slot 2041. The prong sections 2044, 2045 are each elongate parallel to the first longitudinal axis L1. End sections (not denoted specifically) of the prong sections 2044, 2045 bound the insertion opening 2042. As a result of the prong sections 2044, 2045, the first end 201 here has a forked or fork shape. The prong sections 2044, 2045 are elastically resilient in the manner of a flexible spring in the transverse direction of the receiving slot 2041. Said resilience is different in different embodiments. In one embodiment, there is no or no practically relevant resilience.

It goes without saying that the second stylus 300 likewise has a complementary plug-in section 304 at its first end 301. That which has been stated with regard to the complementary plug-in section 204 of the first stylus 200 also applies, mutatis mutandis, to the complementary plug-in section 304. In the present case, the complementary plug-in section 304 of the second stylus 300 is identical to the complementary plug-in section 204 of the first stylus 200.

The plug-in section 501 of the compensation element 500 lies opposite the contact surface 502 along the first contact direction K1. The plug-in section 501 protrudes from a rear face 503 of the compensation element. The plug-in section 501 protrudes from the rear face 503 along the first contact direction K1. In the embodiment shown, the rear face 503 is flat. A normal direction (no reference sign) of the rear face 503 is aligned parallel to the first contact direction K1 and is therefore oriented proximally during use of the surgical instrument 1 (see FIG. 2).

In the embodiment shown, the plug-in section 501 has a shank 5011 and a head 5012. The shank 5011 is adjacent at one end to the rear face 503 and at the other end to the head 5012. The shank 5011 is elongate along the first contact direction K1. The shank 5011 is coordinated dimensionally with the receiving slot 2041, and vice versa. In the attached state of the compensation element 500, the shank 5011 is held in a force-fitting and/or form-fitting manner in the receiving slot 2041. The longitudinal extent of the shank 5011 is orthogonal with respect to the plug-in direction S. Subsequently, the shank 5011 is inserted transversely with respect to its longitudinal extent into the receiving slot 2041 and removed therefrom.

The head 5012 is fixedly connected to the shank 5011 and has a diameter which is not denoted specifically and is larger than a diameter of the shank 5011. By means of the head 5012, the shank 5011 is held distally along the first contact direction K1 in a form-fitting manner at the first end 201. The shank 5011 is held proximally in a form-fitting manner at the first end 201 by means of the rear face 503. In the attached state of the compensation element 500, the rear face 503 consequently lies against the reference surface 203. A front side 5013 of the head 5012 (see FIG. 8) lies against the rear face 205 of the first end 201.

In the embodiment shown, the shank 5011 has a rotationally asymmetrical cross section, not shown specifically. The shape of the rotationally asymmetrical cross section of the shank 5011 corresponds to the shape, shown in the figures, of the end surface of the head 5012. The rotationally asymmetrical cross-sectional shape of the shank 5011 counteracts an inadvertent rotation of the compensation element 500 relative to the first end 201.

The contact surface 202 is convex in the embodiment shown. The convex curvature of the contact surface 502 permits an improved visual check of the contact between compensation element 500 and tibial plateau TP.

In the embodiment shown, the compensation element 500 has a spherical segment section 504 with a spherical dome 505. The spherical dome 505 forms the contact surface 502.

Figure 7:
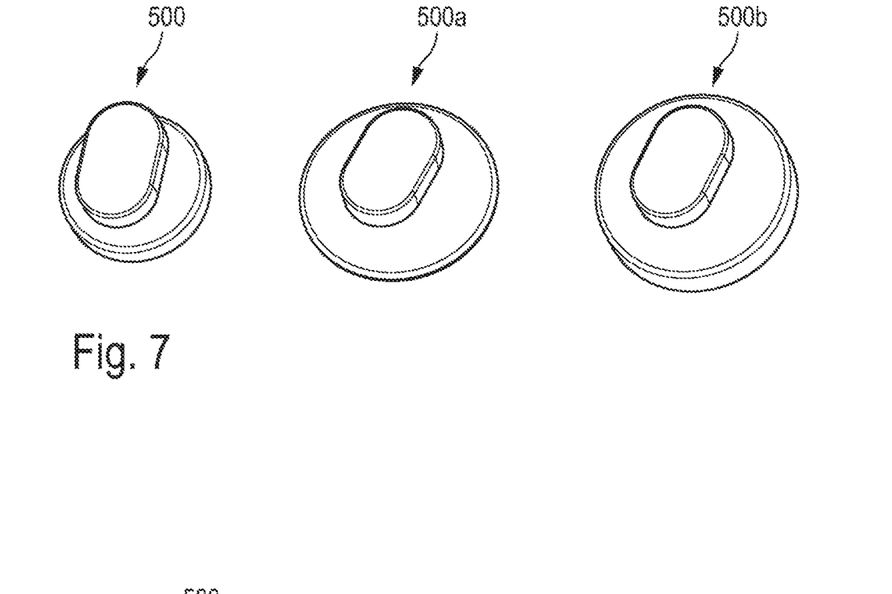
FIG. 7 shows a schematic perspective view of a plurality of different compensation elements of the surgical instrument.

As is shown with reference to FIG. 7, in the embodiment shown, the surgical instrument 1 has a plurality of different compensation elements 500, 500a, 500b. The compensation elements 500, 500a, 500b are also referred to below as first compensation element 500, second compensation element 500a and third compensation element 500b. The different compensation elements 500, 500a, 500b permit compensation of differently sized and/or shaped defects. The compensation elements 500, 500a, 500b differ here with respect to their respective thickness dimension t1, t2 t3 (see FIG. 8). The first compensation element 500 has a first thickness dimension t1. The second compensation element 500a has a second thickness dimension t2. The third compensation element 500b has a third thickness dimension t3. In the present case, the second thickness dimension t2 is smaller than the first thickness dimension t1 and smaller than the third thickness dimension t3. The first thickness dimension t1 is greater than the second thickness dimension t2 and smaller than the third thickness dimension t3. The third thickness dimension t3 is greater than the first thickness dimension t1 and greater than the second thickness dimension t2. The surgeon will select a comparatively small or comparatively large one of the different thickness dimensions t1, t2, t3 depending on whether the defect at the tibial plateau TP is comparatively weak (small) or comparatively strong (large).

The different compensation elements 500, 500a, 500b are identical with respect to the configuration of the respective plug-in section. Consequently, each of the different compensation elements 500, 500a, 500b here has a shank 5011 and a head 5012. The identical configuration of the plug-in sections 501 on the different compensation elements 500, 500a, 500b ensures their exchangeability. In other words, each of the compensation elements 500, 500a, 500b can be attached if required to the first end 201 of the first stylus 200 or to the first end 301 of the second stylus 300.

Furthermore, the different compensation elements 500, 500a, 500b in the present case have different diameters d1, d2, d3 for the respective contact surfaces 502, 502a, 502b. In addition, the contact surfaces 502, 502a, 502b have different curvatures W1, W2, W3. Specifically, the first compensation element has a first diameter d1. The second compensation element 500a has a second diameter d2. The third compensation element 500b has a third diameter d3. The diameters d1, d2, d3 can also be referred to as outer diameters (of the contact surface). In the present case, the first diameter d1 is smaller than the second diameter d2 and smaller than the third diameter d3. The second diameter d2 is greater than the first diameter d1 and slightly smaller than the third diameter d3. The third diameter d3 is greater than the first diameter d1 and slightly greater than the second diameter d2.

It goes without saying that the present number of different compensation elements 500, 500a, 500b should be understood as being purely by way of example. Of course, in different embodiments, the surgical instrument 1 can have more or fewer than the three different compensation elements 500, 500a, 500b shown here. In one embodiment, there is just a single compensation element. In a further embodiment, there are a multiplicity of different compensation elements, for example ten, twenty or thirty.

The invention claimed is:

1. A surgical instrument for use in a knee joint replacement operation, the surgical instrument comprising:
   a main body configured for releasable fastening to a tibial cutting block for cutting guidance on a proximal tibia;
   a first stylus;
   a second stylus; and
   at least one compensation element,
   the first stylus and the second stylus each being mounted on the main body so as to be movable relative to the main body,
   the first stylus and the second stylus each being elongate along a respective longitudinal axis between a first end and a second end,
   the first ends of the first stylus and the second stylus each having a reference surface configured for contacting a tibial plateau of a tibia along a contact direction,
   the at least one compensation element being configured for selective attachment to one of the first stylus and the second stylus,
   the at least one compensation element comprising a plug-in section and a contact surface,
   the first ends of the first stylus and the second stylus each having a complementary plug-in section configured for form-fitting and/or force-fitting, releasable connection to the plug-in section of the at least one compensation element,
   wherein, when the compensation element is attached to said one of the first stylus and the second stylus, the contact surface is configured for contacting the tibial plateau instead of the reference surface of said one of the first stylus and the second stylus, the contact surface being arranged along the contact direction in a manner spaced apart from said reference surface of said one of the first stylus and the second stylus by a thickness dimension,
   wherein the plug-in section is connectable with the complementary plug-in section of said one of the first stylus and the second stylus along a plug-in direction, wherein the plug-in direction extends along the respective longitudinal axis of said one of the first stylus and the second stylus and/or orthogonally with respect to the contact direction.

2. The surgical instrument according to claim 1, wherein the plug-in section and/or the complementary plug-in sections each have/has a rotationally asymmetrical cross section.

3. The surgical instrument according to claim 1, wherein the complementary plug-in sections each comprises a receiving slot that is elongate in a longitudinal direction and configured for receiving the plug-in section in a force-fitting and/or a form-fitting manner.

4. The surgical instrument according to claim 3, wherein the receiving slot is elongate along its longitudinal direction between an insertion opening and a stop.

5. The surgical instrument according to claim 3, wherein the receiving slot reaches in a vertical direction, which is oriented transversely with respect to its longitudinal direction, from the reference surface as far as a rear face of the respective first end, the rear face lying opposite the reference surface along the contact direction.

6. The surgical instrument according to claim 3, wherein the receiving slot is formed between two prong sections of the respective first end, the two prong sections lying opposite one another in a transverse direction oriented transversely with respect to its longitudinal direction.

7. The surgical instrument according to claim 1, wherein the plug-in section protrudes from a rear face of the compensation element, said rear face lying opposite the contact surface along the contact direction.

8. The surgical instrument according to claim 7, wherein the plug-in section has a shank and a head, wherein the shank is elongate between the rear face of the compensation element and the head and is configured to be plugged together transversely with respect to its longitudinal extent with the complementary plug-in section of the respective first end, the head having a larger diameter than the shank.

9. The surgical instrument according to claim 8, wherein the shank and/or the head have/has a rotationally asymmetrical cross section.

10. The surgical instrument according to claim 1, wherein the contact surface is curved convexly.

11. The surgical instrument according to claim 1, wherein the at least one compensation element has a spherical segment section with a spherical dome which forms the contact surface.

12. The surgical instrument according to claim 1, further comprising a plurality of different compensation elements for selective attachment to the first stylus and the second stylus, the different compensation elements differing with respect to a thickness dimension and/or a diameter of the respective contact surface and/or a curvature of the respective contact surface.

13. A surgical instrument system for use in a knee joint replacement operation, the surgical instrument system comprising:
   a surgical instrument according to claim 1;
   a tibial cutting block, to which the surgical instrument is releasably fastened; and
   an extramedullar alignment rod releasably fastened to the tibial cutting block.

14. A surgical instrument for use in a knee joint replacement operation, the surgical instrument comprising:
   a main body configured for releasable fastening to a tibial cutting block for cutting guidance on a proximal tibia;
   a first stylus;
   a second stylus; and
   at least one compensation element,
   the first stylus and the second stylus each being mounted on the main body so as to be movable relative to the main body,
   the first stylus and the second stylus each being elongate between a first end and a second end,
   the first ends of the first stylus and the second stylus each having a reference surface configured for contacting a tibial plateau of a tibia along a contact direction, the at least one compensation element being configured for selective attachment to one of the first stylus and the second stylus, the at least one compensation element comprising a plug-in section and a contact surface, the first ends of the first stylus and the second stylus each having a complementary plug-in section configured for form-fitting and/or force-fitting, releasable connection to the plug-in section of the at least one compensation element, wherein:

when the compensation element is attached to said one of the first stylus and the second stylus, the contact surface is configured for contacting the tibial plateau instead of the reference surface of said one of the first stylus and the second stylus, the contact surface being arranged along the contact direction in a manner spaced apart from said reference surface of said one of the first stylus and the second stylus by a thickness dimension, the complementary plug-in sections each have a receiving slot that is elongate and configured for receiving the plug-in section in a force-fitting and/or a form-fitting manner, and the receiving slot is formed between two prong sections of the respective first end, the two prong sections lying opposite one another in a transverse direction oriented transversely with respect to a longitudinal direction of the receiving slot.

\* \* \* \* \*